Aug. 18, 1953   W. M. DRAKE, JR   2,648,981
FLOWMETER
Filed July 19, 1951   2 Sheets-Sheet 2
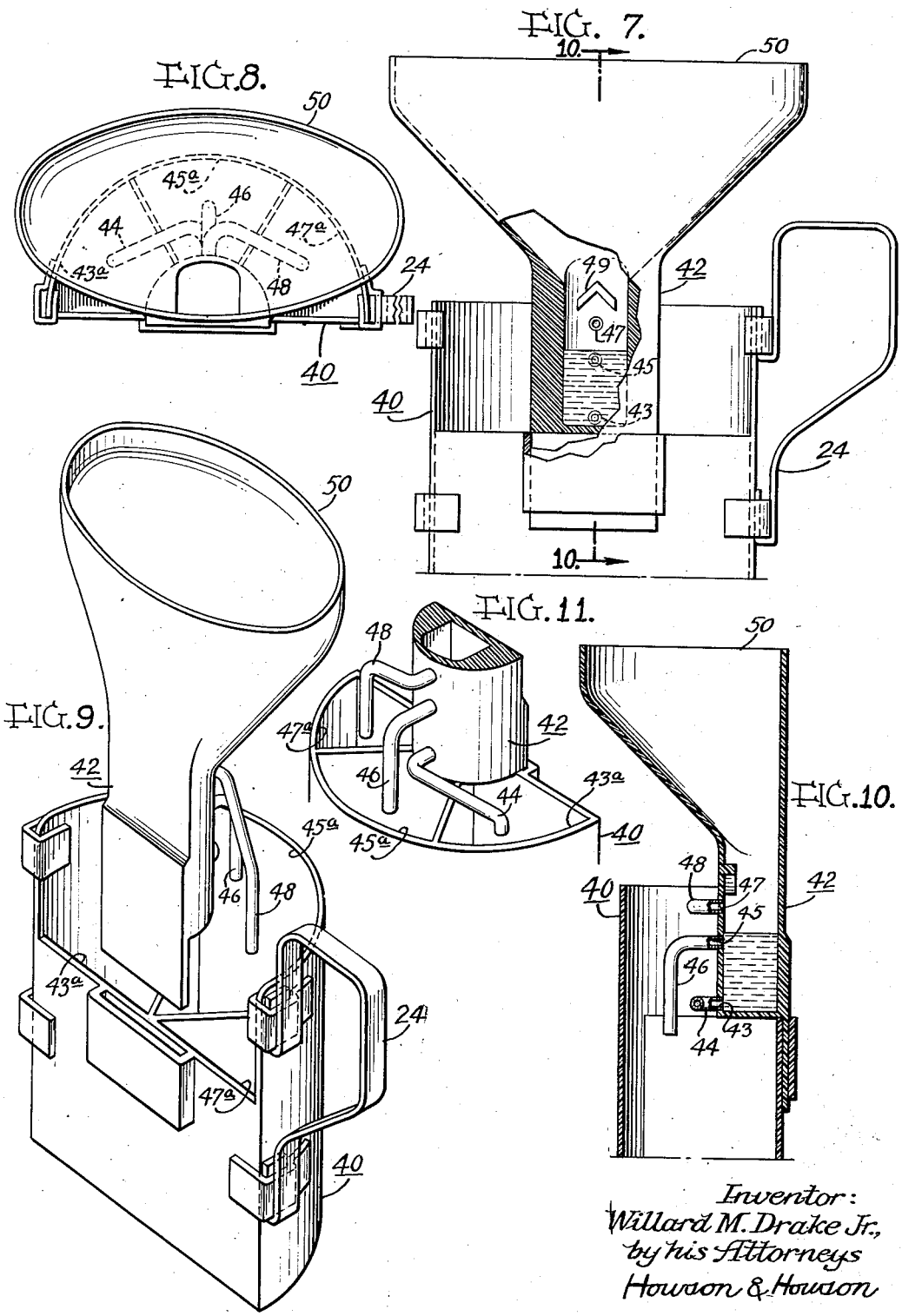
Inventor:
Willard M. Drake Jr.,
by his Attorneys
Howson & Howson Patented Aug. 18, 1953

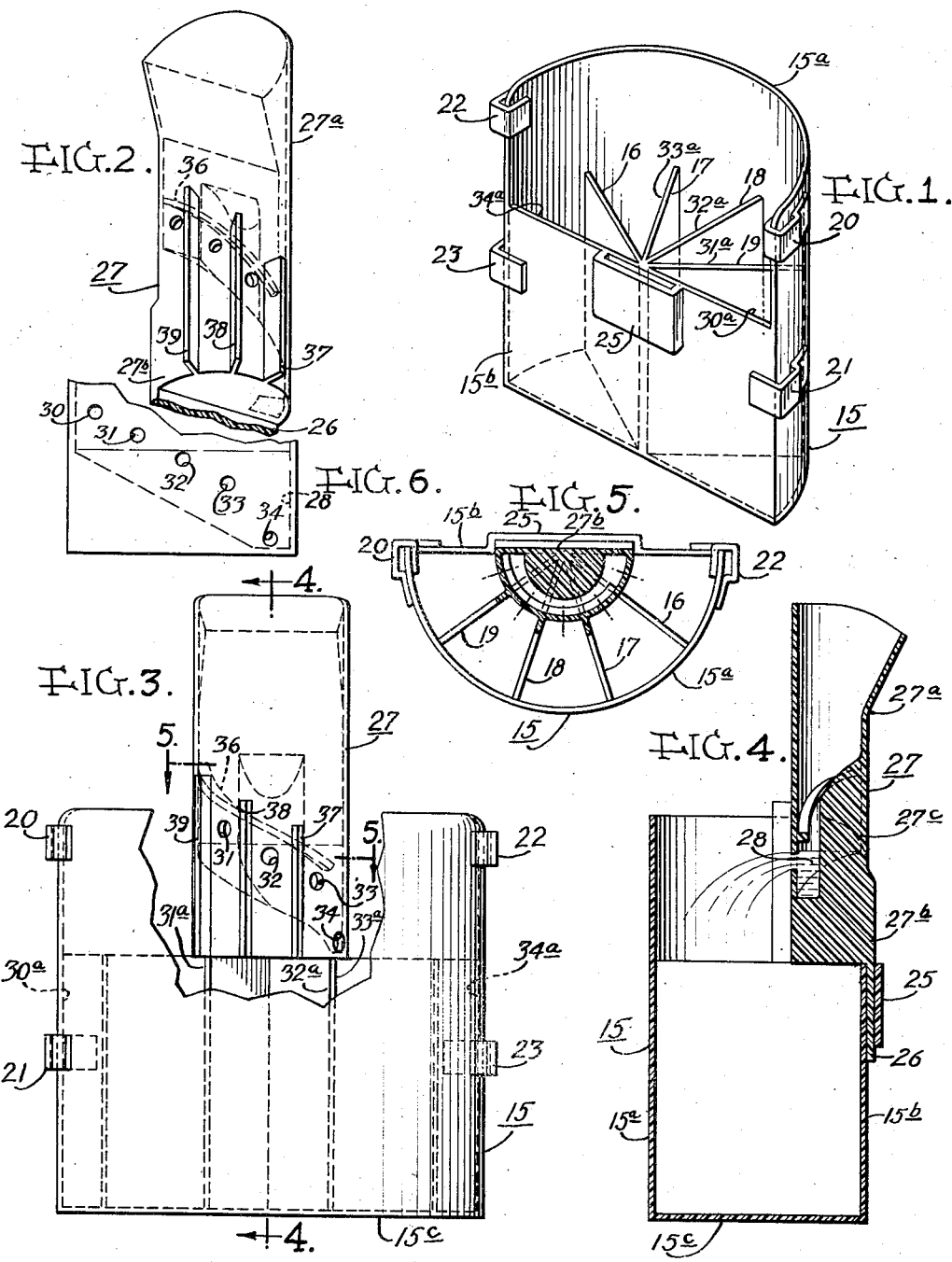

2,648,981

UNITED STATES PATENT OFFICE 2,648,981

FLOWMETER

Willard M. Drake, Jr., Haddonfield, N. J.

Application July 19, 1951, Serial No. 237,495

7 Claims. (Cl. 73—215)

This invention relates to liquid flow measuring apparatus and more particularly to a flowmeter especially adapted to indicate the maximum rate of flow of urine.

It has been known for some time in the field of urology that the proper diagnosis and treatment of certain pathological conditions requires a reasonably accurate indication of the rate at which the patient is able to pass urine. In addition, similar post-operative and/or post-treatment tests enable the physician to evaluate the patient's progress.

Previous devices for measuring the flow of urine have involved complicated and expensive apparatus such as a slit flow clock or a device comparable to an indicator card which is rotated on a cylinder at a predetermined rate. It has been found that such equipment introduces certain errors and that it is not sufficiently inexpensive and portable to create wide acceptance by the medical profession. The present invention provides an extremely simple and inexpensive device capable of both male and female use, which cannot get out of order or adjustment and is therefore peculiarly suited to the needs of practicing physicians.

A primary object of the invention therefore, is to provide a simple device for measuring a patient's rate of passing urine.

A further object of the invention is to provide a liquid flowmeter having a plurality of vertically spaced orifices and receptacles for collecting liquid discharged through each of the orifices.

A further object of the invention is to provide a compartmented reservoir into which liquid jets from a modified weir are selectively received.

A further object of the invention is to provide an improved weir or liquid distributor head having a plurality of orifices and means for indicating the particular orifice through which liquid flows.

A further object of the invention is to provide a device for measuring the rate of flow of urine capable of being conveniently used by both males and females.

Further objects will be apparent from the specification and drawings in which:

Fig. 1 is a perspective of one form of the invention which has a compartmentalized receptacle for liquid such us urine;

Fig. 2 is a perspective of the weir used in conjunction with the receptacle of Fig. 1 equipped with a funnel for male use;

Fig. 3 is a front view partly broken away of the receptacle and weir of Fig. 2 assembled;

Fig. 4 is a vertical section as seen at 4—4 of Fig. 3;

Fig. 5 is a transverse section as seen substantially at 5—5 of Fig. 3;

Fig. 6 is a development showing the relationship of the various orifices in the weir;

Fig. 7 is a front view partly broken away of a modified flow measuring device in which the orifices in the weir are vertically arranged, and having a funnel suitable for female use;

Fig. 8 is a top view of the structure of Fig. 7;

Fig. 9 is a perspective showing the manner of assembling the weir and the receptacle of Fig. 7;

Fig. 10 is a vertical section as seen at 10—10 of Fig. 7; and

Fig. 11 is a fragmentary perspective view showing the lower part of the weir and the upper part of the receptacle of the structure of Figs. 8–10.

The invention comprises essentially the provision of a liquid conduit having a plurality of calibrated vertically spaced orifices and a suitable receptacle for collecting the liquid which is discharged through each of the orifices. In one form of the invention the orifices are displaced horizontally as well as vertically so that the receptacles may all lie substantially in the same horizontal plane without the necessity for separate conduits for collecting and distributing the liquid to each of the receptacles. In another form, the orifices are not horizontally displaced and the discharge may be distributed through a suitable series of pipes or conduits to the separate collecting receptacles.

In a preferred embodiment, the receptacle has a plurality of compartments formed by radial walls extending from the median line of the compartment to an outer arcuate side of the receptacle. A vertical weir is positioned substantially above and adjacent the apex of the radiating walls and the weir has several vertically and horizontally spaced orifices so that liquid introduced into the top of the weir all flows out of the lowest orifice into a first compartment unless the flow exceeds a predetermined calculated amount, in which event it flows out of the second lowest orifice and into a second compartment. If the rate of flow is sufficient to raise the level of liquid in the weir above the first and second orifices more than a predetermined amount, it will be discharged through the third orifice into the third compartment, and so on.

While the present apparatus has been designed especially for measuring the rate with which a patient is able to pass urine, it will be understood that the apparatus is capable of measuring the rate of flow of any liquid.

It will therefore be understood that the present invention incorporates funnels formed integrally with the top of the weir which are designed for the convenient introduction of urine when passed by a patient. Any suitable liquid collecting device can be employed however, depending on the purpose for which the flowmeter may be used. Likewise, a suitable detachable handle to facilitate use by the patient is provided and in this connection, it may be stated that the ability to provide a simple apparatus which the patient can conveniently use in privacy and which does not involve the presence of a nurse or doctor, as well as intricate apparatus, has been found to be very important in obtaining accurate indications of urine flow. This is due to the simple and well recognized fact that many patients have a psychological inhibition which either prevents or retards urination in the presence of another person. Therefore the value of urine flow rate readings is negligible unless extraneous conditions which might give erroneous readings and therefore an improper diagnosis, are eliminated. This has been a serious objection to devices used in the past.

Referring now to Figs. 1-6, the flowmeter assembly is desirably formed of a synthetic plastic material such as methyl methacrylate or it can be made of metal. In one embodiment, the receptacle 15 is formed from a piece of tubing cut in half longitudinally to provide a semi-circular side 15a for the receptacle. A flat side 15b is connected to side 15a and it will be noted that side 15a extends somewhat above flat side 15b to act as a splash guard. A plurality of walls 16, 17, 18 and 19 extend radially from the median line of side 15b and are tightly joined to the curved side 15a and to the bottom 15c. The receptacle 15 is provided with a pair of sockets 20, 21 and 22, 23 on either side, to which a handle 24 (Figs. 7 and 9) may be selectively attached. A wide socket or eye 25 is secured to side 15b and this socket receives a tab 26 formed integrally with weir assembly 27.

Weir 27 is likewise fabricated from a semicircular length of plastic tubing 27a having a bottom plug 27b cemented thereto. The plug 27b (as shown in Fig. 4) extends into the base of the weir to form a substantial restriction 27c which leaves a relatively narrow semi-circular passage 28 at the bottom of the weir. The semicircular side 27a of the weir is provided with a plurality of vertically spaced holes or orifices 30, 31, 32, 33 and 34 (Fig. 6) through which liquid introduced into the weir is discharged into the receptacle. The lowermost orifice 34 is positioned substantially at the bottom of passage 28 so that any liquid introduced into the passage 28 immediately flows out of orifice 34 and into its aligned compartment 34a. Orifice 33 is located substantially above and to the left (as seen in Fig. 6) of orifice 34 and is in vertical alignment with compartment 33a. Similarly, orifice 32 is above orifice 33 and in alignment with compartment 32a. Orifice 31 is in alignment with compartment 31a, and orifice 30 is in alignment with compartment 30a so that any liquid emerging from the various orifices is entirely received within the compartment aligned with one of the orifices.

Medical experience has determined that the normal rate at which a patient voids urine is substantially 20 cc. per second and the chief utility for the present device is to detect deviations from this normal rate. Furthermore, if the readings are reasonably accurate for increments of 5 cc. per second, an entirely satisfactory diagnosis can be made by the physician. Therefore, in the form of Figs. 1-6 the volume of passage 28 below orifice 31 as well as the diameter of orifices 32—34 is so calculated that liquid introduced into the weir at the rate of 20 cc. per second rises to a height in passage 28 sufficient to discharge liquid from the four orifices 31—34 but does not rise sufficiently high to be discharged from orifice 30. It will be understood that any liquid discharged from orifice 31 is collected in compartment 31a so that if the patient has a normal rate, the physician will find a substantial amount of urine in the four compartments 31a—34a. If the rate of flow is between 15 and 20 cc. per second, liquid will be collected only in compartments 32a—34a. If the rate is between 10 cc. and 15 cc. per second, then there will be liquid in only compartments 33a and 34a, whereas if the rate is lower than 10 cc. per second, all of the urine passed will be in compartment 34a. While it is relatively rare that a patient's rate substantially exceeds the normal, nevertheless I provide the highest orifice 30 which is so spaced that liquid will be collected in compartment 30a only if the patient's rate is equal to or exceeds 25 cc. per second. This is primarily a check on what otherwise might appear to be a perfectly normal rate.

The weir described above provides extremely accurate indications of maximum urine flow assuming the patient is able to pass substantially 200 cc.; this is well below the normal volume. In order to reduce the volume required for accurate readings to a minimum, I restrict the passage 28 by providing a sloping bottom 35 for the passage and also by extending the plug 27c to substantially fill the bore of the weir, as previously described.

Additional precautions producing increased accuracy are the provision of a sloping baffle 36 positioned above the orifices and in a manner to direct all flow of liquid to the bottom of passage 28, thus preventing any liquid from running out of the orifices without filling the passage first.

When the weir is fabricated of methyl methacrylate, I have found that the absence of high wetting, characteristic of this material, prevents the liquid discharge from the orifices from spreading horizontally across the outer surface of the weir. However, if it is found that the use of some other material, or the size of the orifices is such that there is any tendency for liquid discharged from any orifice to flow across the outer surface of the weir and thus to run into an improper compartment, a series of vertical guides 37, 38 and 39 are secured to the outside of the weir between the orifices. In the form of Figs. 1-6, it is of course, only necessary for these guides to be used between orifices 30—33 since orifice 34 is so low that liquid discharged from it could not collect in compartment 33a and any liquid discharged from orifice 33 running over into compartment 34a would not affect the accuracy of the reading.

Referring now to Figs. 7-11, the modified receptacle 40 is similar to receptacle 15 except that only three compartments are here illustrated. Figs. 7 and 8 also show the removable handle 24 which may be used with the receptacle 15 as well. The modified weir assembly 42 achieves a result similar to the weir 27 but instead of displacing the orifices horizontally, they are in substantial vertical alignment. The bottom orifice 43 is provided with an external conduit or tube 44 which directs all liquid discharged from orifice 43 into compartment 43a. The next higher orifice 45 has a conduit 46 directing liquid into the middle compartment 45a and the highest orifice 47 is provided with a conduit 48 for directing liquid into compartment 47a. While only three orifices have been shown in conjunction with Figs. 7–11, it will be understood that any convenient number may be used and then the same number of compartments in receptacle 40 will be employed. The bore of weir 42 is of reduced volume so that the amount of liquid necessary to flow out of the higher orifices will be substantially equivalent to that obtained with the previously described construction. A V-shaped baffle 49 over the highest orifice prevents liquid from flowing down the inside of the bore and out of any of the orifices before filling the bottom.

Weir 40 is provided with an enlarged oval-shaped funnel 50 suitable for female use. It will be understood however, that the shape of the funnel is in no way dependent upon the form of the weir and that a female funnel formed on weir 27 for example, can be interchangeably secured to any receptacle 15. Conversely, a male weir of the type shown in Fig. 7 would be interchangeable with any receptacle 40.

It will thus be apparent that I have provided an extremely inexpensive and simple device capable of measuring with required accuracy, the maximum rate of flow of liquid. This device when properly calibrated is particularly useful in the treatment of urological conditions because it enables the physician to accurately diagnose the patient's complaints and to check the results of whatever treatment may have been given.

Having thus described my invention,
I claim:

1. Apparatus for determining rate of liquid flow, comprising a container having vertical partitions dividing it into a plurality of liquid-receiving compartments, and a receptacle mounted on the upper part of said container to receive a flowing stream of liquid and having a plurality of vertically-spaced outlet orifices corresponding in number to the number of said compartments and arranged respectively to discharge liquid into the respective compartments, said orifices establishing different levels in said receptacle which are reached by the liquid according to its rate of flow, each orifice representing a liquid flow determined by the volume of said receptacle below that orifice and by the size of any lower orifice, whereby the maximum rate of flow of the liquid in said stream during a given time is indicated at the end of that time by the number of said compartments containing liquid.

2. Apparatus for determining rate of liquid flow, comprising a container having vertical partitions dividing it into a plurality of liquid-receiving compartments, a receptacle mounted on the upper part of said container to recive a flowing stream of liquid and having a plurality of vertically-spaced outlet orifices corresponding in number to the number of said compartments, and means in said receptacle to direct the incoming liquid to the bottom of the receptacle, said orifices establishing different levels in said receptacle which are reached by the liquid according to its rate of flow, each orifice representing a liquid flow determined by the volume of said receptacle below that orifice and by the size of any lower orifice, whereby the maximum rate of flow of the liquid in said stream during a given time is indicated at the end of that time by the number of said compartments containing liquid.

3. Apparatus for determining rate of liquid flow, comprising a vertical container having a substantially planar wall, a plurality of vertical partitions extending radially from the vertical median line of said wall and dividing said container into a plurality of liquid-receiving compartments, and a receptacle mounted on said wall to receive a flowing stream of liquid and having a plurality of vertically-spaced outlet orifices corresponding in number to the number of said compartments and arranged respectively to discharge liquid into the respective compartments, said orifices establishing different levels in said receptable which are reached by the liquid according to its rate of flow, each orifice representing a liquid flow determined by the volume of said receptacle below that orifice and by the size of any lower orifice, whereby the maximum rate of flow of the liquid in said stream during a given time is indicated at the end of that time by the number of said compartments containing liquid.

4. Apparatus for determining rate of liquid flow, comprising a container having vertical partitions dividing it into a plurality of compartments, and a device mounted on the upper part of said container for supplying liquid of a flowing stream to said compartments according to the rate of flow of the stream, said device comprising a receptacle having a plurality of orifices corresponding in number to the number of said compartments and vertically aligned respectively with said compartments to discharge liquid into the respective compartments, said orifices being spaced vertically to establish different levels which are reached by the liquid according to its rate of flow, each orifice representing a liquid flow determined by the volume of said receptacle below that orifice and by the size of any lower orifice, whereby the maximum rate of flow of the liquid in said stream during a given time is indicated at the end of that time by the number of said compartments containing liquid.

5. Apparatus for determining rate of liquid flow, comprising a container having vertical partitions dividing it into a plurality of compartments, and a device mounted on the upper part of said container for supplying liquid of a flowing stream to said compartments according to the rate of flow of the stream, said device comprising a receptacle having a plurality of vertically-spaced and vertically-aligned orifices corresponding in number to the number of said compartments and conduits for conveying liquid from the respective orifices to the respective compartments, said orifices establishing different levels which are reached by the liquid according to its rate of flow, each orifice representing a liquid flow determined by the volume of said receptacle below that orifice and by the size of any lower orifice, whereby the maximum rate of flow of the liquid in said stream during a given time is indicated at the end of that time by the number of said compartments containing liquid.

6. Apparatus for determining rate of liquid flow, comprising a semi-cylindrical vertical container having a flat wall and an arcuate wall, a plurality of vertical partitions extending radially from the vertical median line of said flat wall to said arcuate wall and dividing said container into a plurality of compartments, and a device mounted on the upper part of said flat wall for supplying liquid of a flowing stream to said compartments according to the rate of flow of the stream, said device comprising an open-top receptacle having a plurality of vertically-spaced wall orifices corresponding in number to the number of said compartments and arranged respectively to discharge liquid into the respective compartments, said orifices establishing different levels which are reached by the liquid according to its rate of flow, each orifice representing a liquid flow determined by the volume of said receptacle below that orifice and by the size of any lower orifice, whereby the maximum rate of flow of the liquid in said stream during a given time is indicated at the end of that time by the number of said compartments containing liquid.

7. Apparatus according to claim 6, wherein said receptacle is of semi-cylindrical horizontal cross-section and each orifice is vertically aligned with one of said compartments.

WILLARD M. DRAKE, Jr.

References Cited in the file of this patent

UNITED STATES PATENTS

| Number | Name | Date |
| --- | --- | --- |
| 669,347 | Quinn | Mar. 5, 1901 |
| 695,167 | McGriff | Mar. 11, 1902 |
| 898,701 | Tate | Sept. 15, 1908 |
| 1,015,556 | Gibson | Jan. 23, 1912 |
| 1,049,718 | Howard | Jan. 7, 1913 |
| 1,080,052 | Englebright | Dec. 2, 1913 |

FOREIGN PATENTS

| Number | Country | Date |
| --- | --- | --- |
| 593,331 | Germany | Feb. 24, 1934 |
| 797,070 | France | Feb. 3, 1936 |